Oct. 11, 1966                R. P. METZ                3,278,698
                CONTROL CENTER WITH WITHDRAWABLE CONTROL UNIT
Filed March 27, 1964                                5 Sheets-Sheet 4

Oct. 11, 1966  R. P. METZ  3,278,698
CONTROL CENTER WITH WITHDRAWABLE CONTROL UNIT
Filed March 27, 1964  5 Sheets-Sheet 5

United States Patent Office 3,278,698
Patented Oct. 11, 1966

3,278,698
CONTROL CENTER WITH WITHDRAWABLE CONTROL UNIT
Robert P. Metz, Monroeville, Pa., assignor to Westinghouse Electric Corporation, Pittsburgh, Pa., a corporation of Pennsylvania
Filed Mar. 27, 1964, Ser. No. 355,272
7 Claims. (Cl. 200—50)

This invention relates generally to switchboards and more particularly to control centers of the type comprising a cabinet and a withdrawable control unit supported in the cabinet.

In the patent to Stewart, Patent No. 2,719,251, issued Sept. 27, 1955, there is disclosed a switchboard or control center comprising a cabinet having a plurality of bus bars supported therein and a plurality of control units supported in the cabinet and electrically connected to the bus bars, each of which control units is withdrawable from a position wherein it is connected to the bus bars to a position wherein it is disconnected from the bus bars. Thus, a worker can withdraw a control unit to a disconnected position to safely inspect, adjust, replace or repair the control apparatus within the unit. Moreover, a worker can completely remove one of the withdrawable control units and replace a complete unit for the removed unit. It is old in these prior art type control centers to provide a door hingedly connected to the cabinet with an external operating handle mounted on the door and means automatically connecting the external operating handle to an enclosed circuit interrupter when the door is closed to thereby provide for external operation of the enclosed circuit interrupter. Interlocking means are generally provided to defeatably latch the door closed when the enclosed circuit interrupter is in the closed position and to automatically unlatch the door when the enclosed circuit interrupter is operated to the "off" or open position. Thus, a worker, to gain access to the control unit, will ordinarily operate the circuit interrupter to the open position and then open the door and withdraw the enclosed control unit to the disconnected position. With the external operating handle mounted on the door, when the unit is in the withdrawn or disconnected position, the circuit interrupter operating handle is exposed and a worker may more readily operate the handle either accidentally or intentionally to close the interrupter. Thereafter, if the control unit is moved into the connected position on the bus bars damaging arcs can pre-strike between the bus bars and the plug-in connectors particularly if there is an overload or fault in the controlled circuit of the control unit. Moreover, with the external handle mounted on the door rather than on the unit, a disconnection of the external handle from the enclosed circuit interrupter is effected during each opening operation of the door and a connection of the external operating handle with the enclosed circuit interrupter is effected during each closing operation of the door. In some cases, if the parts are not properly aligned, there could be a jamming of parts and the external operating handle might not become properly connected to the enclosed circuit interrupter when the door is moved to the closed position.

A primary object of this invention is to advance the art by providing an improved switchboard or control center structure comprising a withdrawable control unit and an external operating handle mounted on the withdrawable unit which handle is continuously operatively connected to the enclosed circuit interrupter regardless of the position of the cabinet door and regardless of the position of the withdrawable control unit.

Another object of this invention is to provide an improved control center structure constructed in accordance with the above primary object and with improved latch means operating automatically upon an opening operation of the cabinet door to prevent a closing operation of the circuit interrupter.

Another object of this invention is to provide an improved control center structure constructed in accordance with the above primary object and with improved latch means operating automatically to defeatably latch the circuit interrupter in the open position when the cabinet cover is opened, which latch means operates automatically to defeatably latch the cabinet door closed when the circuit interrupter is operated to the closed position.

Another object of this invention is to provide an improved control center structure combination comprising an improved externally operable visible-blade circuit interrupter structure.

Another object of this invention is to provide an improved control center structure comprising improved external operating handle means for operating an enclosed circuit interrupter.

Another object of this invention is to provide an improved control center structure comprising a withdrawable control unit having an external operating handle mounted on the unit receptacle and means removably connecting the operating handle to a control unit circuit interrupter structure that can be replaced with circuit interrupter structures having different ratings.

Another object of this invention is to provide an improved control center structure of the type comprising a cabinet with a withdrawable control unit mounted within the cabinet and an external operating handle and an operating mechanism supported on the unit receptacle to operate a circuit interrupter structure with means for replacing the circuit interrupter structure without replacing the operating handle and operating mechanism.

Another object of this invention is to provide an improved control center structure comprising a cabinet and a withdrawable control unit supported in the cabinet with an external operating handle structure supported on the unit receptacle to operate a circuit interrupter structure that is supported in the receptacle which combination also comprises improved safety latch means supported on the receptacle and cooperable with both the operating handle structure and the cabinet cover to provide various safety latching features.

A more general object of this invention is to provide an improved control center structure with improved operating and safety features and increased versatility over prior art switchboards.

The invention, both as to structure and operation, together with additional objects and advantages thereof, will be best understood from the following detailed description when read in conjunction with the accompanying drawings;

Figure 1:
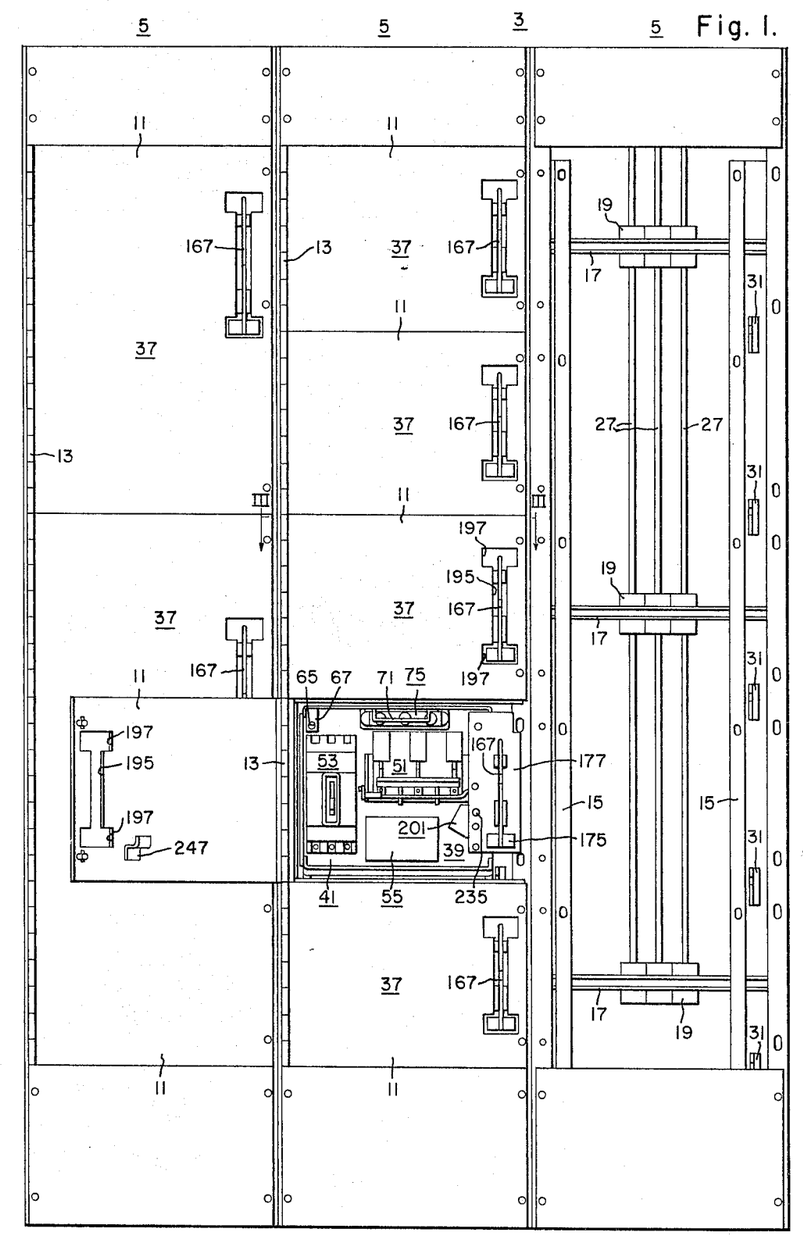
FIGURE 1 is a front elevational view, with parts broken away, of a control center structure embodying the principal features of this invention.
Figures 2, 7, 9:
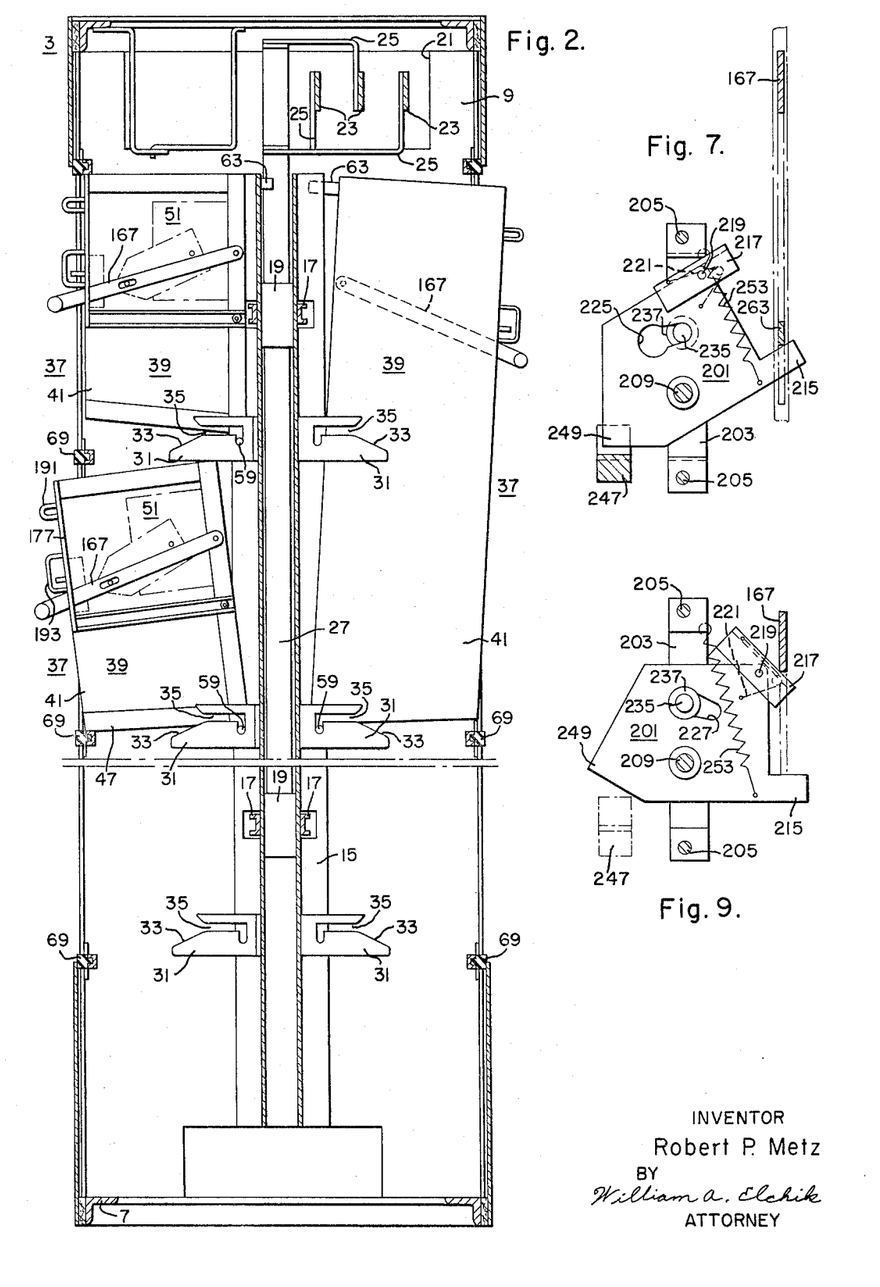
FIGURE 2 is an end sectional view, on an enlarged scale relative to FIG. 1 and with parts broken away, of the control center structure seen in FIG. 1 with two of the control units being shown in the disconnected position.
FIGS. 7, 8 and 9 are views illustrating the various operating positions of the latch means, operating arm and cover latch seen in FIGS. 1-5.
Figure 3:
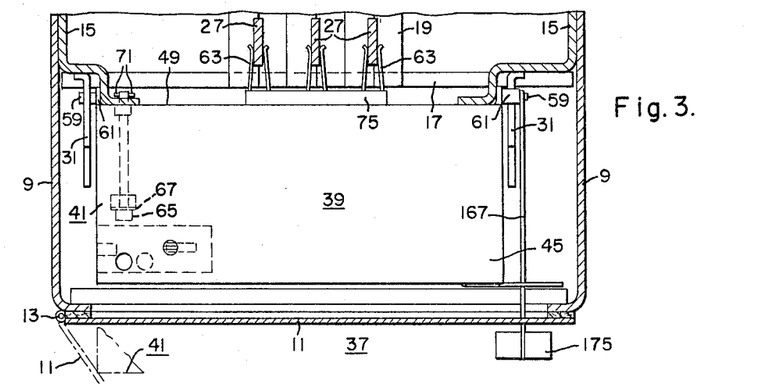
FIG. 3 is a partial sectional view taken generally along the line III—III of FIG. 1.

Referring to the drawings, there is shown, in FIGS. 1 and 2, a switchboard or control center 3 comprising three adjacent sections 5. It is to be understood that a completed control center may include more or less than three sections similar to the adjacent sections 5 disclosed in FIG. 1. Each of the sections 5 comprises a sheet-metal base plate 7 (FIG. 2) and two generally parallel sheet-metal side plates or side walls 9 (FIG. 3). A plurality of covers 11 (FIGS. 1 and 3) are supported by means of hinges 13 on the cabinet. Each of the covers 11 is supported on one of the side plates 9. As can be seen in FIG. 1, the doors or covers 11 can be of varying sizes to fit different compartments and control units in the cabinet.

In each section 5, two parallel metallic supporting posts 15 are secured to the opposite side walls 9 of the section. As can be seen in FIGS. 1 and 2, a plurality of metallic support members 17 are suitably secured to the opposite supporting posts 15. Each of the support members 17 supports an insulating bus-bar support member 19. As can be seen in FIG. 2, each of the internal side plates 9 has an opening 21 therein and three bus bars 23 which are suitably supported in the cabinet extend through the openings 21 to feed the three sections 5 of the control center 3. In each section 5, a plurality of electrical connectors 25 connect the horizontal bus bars 23 with three vertical bus bars 27 (FIG. 1) that are supported in each of the sections 5 by means of the associated insulating supports 19. As is best seen in FIG. 2, in each of the sections 5, a plurality of control unit support members 31 are supported on each of the supporting posts 15. Each of the control unit support members 31 has an inclined surface 33 thereon leading into a slot 35 in the support member 31.

Figure 4:
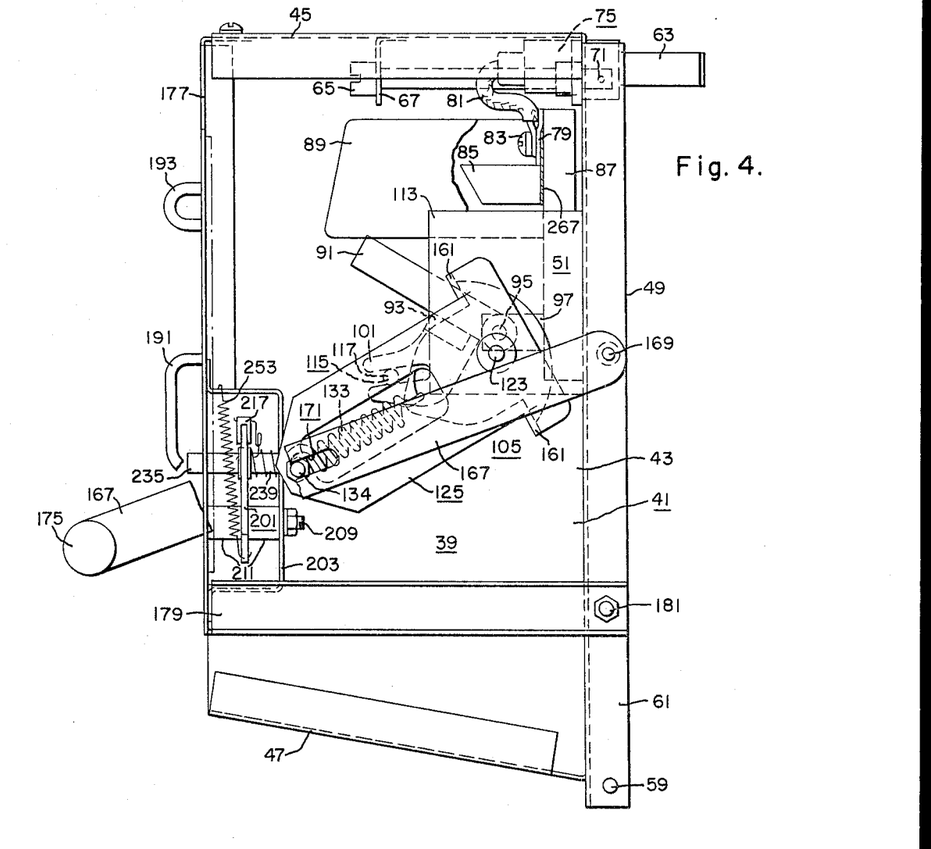
FIG. 4 is a side view, with parts broken away, of the control unit seen in FIG. 1.

As can be seen in FIG. 1, each of the sections 5 comprises a plurality of control sections 37. The control sections may be of different sizes depending upon the particular control requirements of the switchboard. Each of the control sections 37 comprises the associated openable cover 11 that is openable to expose an opening in the switchboard 3 and a control unit 39 supported within the switchboard cabinet adjacent the associated openable cover 11. Each of the control units 39 comprises a control unit support or receptacle 41. As is best seen in FIG. 4, each of the receptacles 41 comprises a metallic side wall 43, a metallic top wall 45, and an inclined metallic bottom wall 47. The wall space opposite the side wall 43 is left open, although it can readily be understood that a side plate similar to the side plate 43 could be utilized to provide a receptacle enclosed at the back and all four sides thereof. The wall portions 45, 39 and 47, are all connected to a bottom plate or a back plate 49 and they lead out toward an open front as is seen in FIG. 1. In each of the receptacles 41 there is supported a plurality of control devices. As can be seen in the exposed unit in FIG. 1, there is a switch structure indicated at 51, a molded-case type circuit breaker indicated at 53 and a contactor indicated generally at 55 all supported on the base plate of the receptacle 41 of the exposed unit. The switches, circuit breakers and contactors that may be supported in the unit may be of any of a number of different sizes and ratings depending upon the particular control requirements of the switchboard.

The circuit breaker 53 (FIG. 1) may be a standard molded-case type circuit breaker of the type disclosed, for example, in the patent to A. R. Cellerini et al., Patent No. 2,795,670, issued June 11, 1957. The contactor 55 may be a contactor of the type disclosed, for example, in the patent to D. Ellis, Patent No. 2,550,110 issued April 24, 1951. The disclosed switch structure 51 comprises a three-pole knife-blade switch structure that will be hereinafter more fully described.

For the purpose of clarity, the particular wiring in the control unit is left out. A person skilled in the art, however, will understand that the control devices will be wired in a well known manner in order to effectively control and provide power to the associated electrical apparatus.

As can be seen in FIGS. 2–5, a supporting pin 59 is rigidly secured to a flange part 61 of the base plate 49 of the receptacle 41 at each of two opposite sides of the receptacle 41. When the control unit 39 is to be mounted in the associated opening in the switchboard 3, the opposite supporting pins 59 are placed against the inclined surfaces 33 (FIG. 2) of the oppositely disposed support members 31 and the unit 39 is then moved forward moving the pins 59 into the slots 35 until the pins 59 drop down into the end portions of the slots 35. Thereafter, the control unit 39 is rotated about the pins 59 moving three clip-on type bus bar contact members 63 (FIGS. 2–4) into clip-on contact engagement with the associated three bus bars 27. When the control unit 39 is in the connected and operating position, a bolt member 65 which is supported on the receptacle 41 by means of a bracket 67 and which protrudes out through the bottom of the receptacle 41, is passed through a suitable or mating opening in one of the supporting posts 15 and rotated 90° to move two extensions 71 (FIG. 3) out of alignment with the mating opening to thereby secure the member in the connected position. In order to disconnect the receptacle, the bolt 65 must be rotated back to line-up the extensions 71 with the associated mating opening in the supporting post 15 to thereby enable a pivoting disconnecting movement of the unit 39 about the pivot supporting pins 59.

As can be seen in FIG. 2, each of the units 39 can be moved from a connected position wherein the clip type contact members 63 engage the associated bus bars 27 to a disconnected position wherein the clip type contact members 63 are disconnected from the bus bars; but wherein the unit is still supported on the cabinet. In order to move the particular unit to the disconnected position, the bolt 65 (FIG. 3) is rotated to move the extensions 71 into proper alignment with the mating opening in the supporting post 15 and thereafter the unit 39 is pivoted forward until the bottom plate 47 thereof engages a support 69 at the front of the switchboard. Thus, the unit will be supported in the disconnected position by means of the pins 59 and the bottom plate 47 engaging the unit 69. In order to completely withdraw or remove the unit, the unit is grasped by a handle part 71 and lifted to move the pins 59 out of the slot 35 and the unit is then pulled completely out of the switchboard. Thus, the unit can be moved to a disconnected position to enable a worker to adjust, inspect or replace parts therein; or, if desired, the unit can be completely removed from the switchboard. When the unit is in the disconnected position, it can be reconnected merely by grasping the handle 71 and pivoting the unit about the pivot pins 59 until the clip-on connectors 63 engage the bus bars 27. Thereafter, the bolt 65 is operated to secure the unit in the connected position in the same manner hereinbefore described.

Figures 5, 6, 8:
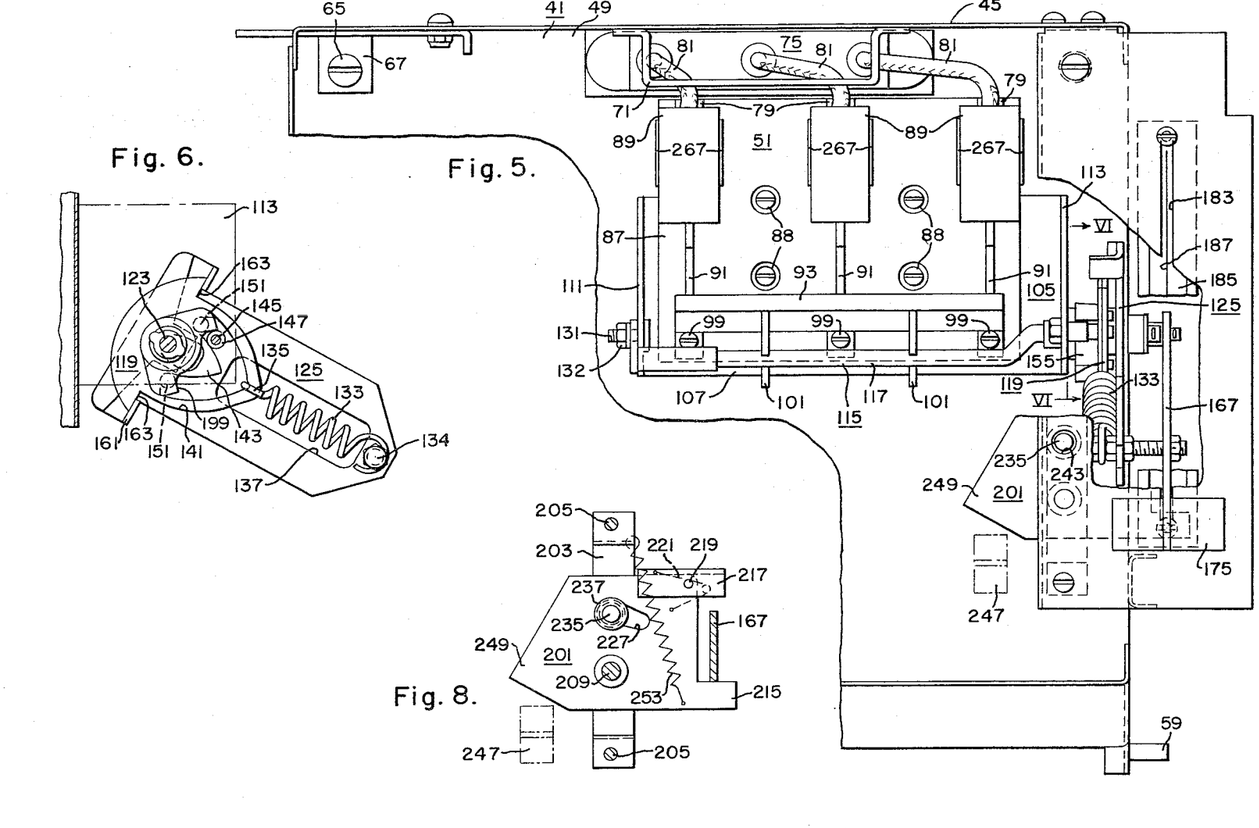
FIG. 5 is a partial enlarged front view, with parts broken away, of the control unit seen in FIG. 4.
FIG. 6 is a partial sectional view taken along the line VI—VI of FIG. 5.

Referring to FIGS. 3–5, it can be seen that the three clip-on type bus bar contact members 63 are supported on an insulating support member 75 that is supported on the associated base plate 49 of the receptacle 41. The insulating support 75 is supported at an opening in the base plate 49 to extend out through the back of the receptacle 41. As can be seen in FIGS. 4 and 5, each of the clip-on bus bar connectors 63 is electrically connected to conductor 79 by means of a flexible conductor 81 that is secured to a terminal 83 on the switch 51. A clip-type stationary contact 85 is suitably connected to each of the conductors 79. The conductor 79, terminals 83 and stationary contacts 85 are suitably secured to an insulating block 87 that is in turn suitably secured to the base plate 49 of the receptacle 41 by means of screws 88. The switch structure 51 also comprises three insulating arc-hoods 89 provided at each of the stationary contacts 85 to extinguish arcs that may be drawn when the switch is operated to the open position. In addition to the stationary contacts 85, the switch structure 51 also comprises three movable knife-blade type contact arms 91 that are all secured to a common insulating tie bar 93. Each of the movable contact arms 91 is pivotally connected (FIG. 4) by means of a pivot pin 95 on a conducting support 97 that is suitably secured to the insulating support 87. Suitable terminals 99 (FIG. 5) are provided for enabling connection of the supports 97 and movable contact arms 91 of the multi-pole switch structure 51 in the electric circuit that is to be controlled by operation of the switch. Two bifurcated connecting arms 101 are fixedly secured to the tie bar 93 and extend outward (FIG. 4) from the tie bar 93.

Figure 10:
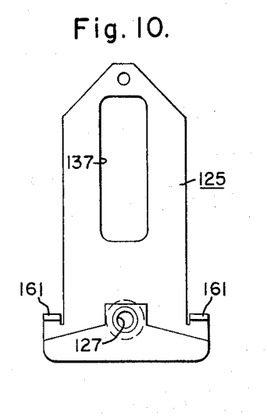
FIGS. 10 and 11 are elevational and end views respectively of one part of the operating mechanism disclosed in FIGS. 4–6.
Figure 11:
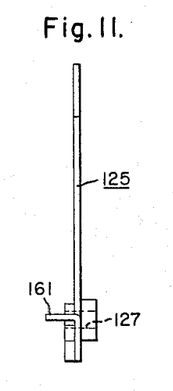

The circuit interrupter structure 51 is operated by means of an operating mechanism indicated generally at 105. The operating mechanism 105 is supported on the receptacle 41 by means of a generally U-shaped metallic supporting plate 107. The bight portion of the U-shaped supporting plate 107 is supported on the back plate 49 of the receptacle 41 between the insulating switch-structure support 87 and the back-plate 49 by means of the screws 88. The two opposite leg portions 111 and 113 of the U-shaped supporting plate 107 extend out toward the opening of the receptacle 41. An operating rod structure 115 (FIG. 13) is rotatably supported at its two opposite ends on the leg portions 111, 113 of the supporting plate 107. The operating rod structure 115 comprises a rod part 117 that fits between the bifurcations of the two operating arms 101 (FIGS. 4 and 5) that are connected to the insulating tie bar 93. Pivotal movement of the operating rod 115 therefore is transmitted to the switch movable contacts 91 of the switch structure 51 through the operating arms 101 and the insulating tie bar 93. In addition to the operating rod 115, the operating mechanism 105 comprises a member 119 (FIG. 12) having an opening 121 therein that fits over an end portion 123 (FIG. 13) of the rod structure 115. The operating mechanism also comprises a member 125 (FIGS. 10 and 11) having an opening 127 therein that fits over the end portion 123 of the rod structure 115. The members 121 and 119 and 125 are rotatable on the end portion 123 of the rod structure 115.

Figure 13:
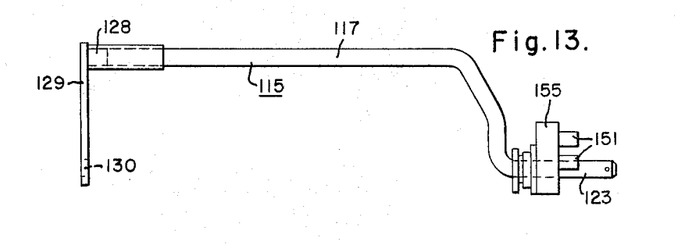

Referring to FIGS. 4, 5 and 13, the end portion 123 of the rod member 117 is rotatably supported in a suitable opening in the leg part 113 of the supporting plate 107. A cylinder member 128 fits over the other end of rod member 117 and a supporting arm 129 that is fixedly secured to the cylinder member 128 is provided with an opening 130 (FIG. 13) therein to receive a pin 131 (FIG. 5) that passes through a suitable opening in the supporting leg 111 of the plate 107. A nut 132 is secured to the threaded end of the pin 131 to secure the pin in position. Thus, the pin 131 provides a rotatable support for the other end of the operating rod structure 115.

Figure 12:
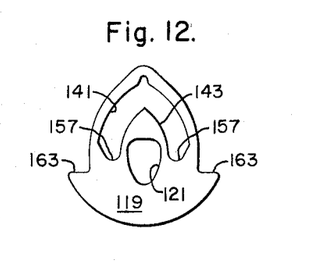
FIGS. 12 and 13 are elevational views of parts of the operating mechanism disclosed in FIGS. 4–6.

As can be seen in FIG. 6, an overcenter spring 133 is supported, under tension, at one end on a pin 134 that is secured to the member 125. The other end 135 (FIG. 6) of the spring 133 is hooked over a part of the member 119. The spring 133 fits in an opening 137 (FIG. 10) in the member 125. As can be seen in FIG. 12, the member 119 is provided with an opening 141 therein forming an apex-part 143. A pin member 145 (FIG. 6) is fixedly supported to the leg portion 113 of the support plate 107, and a roller 147 that is secured to the pin 145 rides in a track formed on the member 119 by means of the opening 141 (FIG. 12). Two projections 151 (FIG. 13) that are rigidly a part of a member 155 that is welded or otherwise rigidly secured to the operating rod 117, are provided to cooperate with the member 119. The projections 151 (FIG. 13) fit within the opening 141 of the member 119. One of the projections 151 is adapted to be engaged by one edge 157 on the member 119 and the other projection 151 (FIG. 13) is adapted to be engaged by another edge 157 on the member 119 (FIG. 12). Two projections 161 (FIGS. 10 and 11) on the member 125 engage opposite ledges 163 (FIG. 12) on the member 119 in a manner to be hereinafter specifically described. The operating mechanism 105 also comprises an elongated operating member 167 that is pivotally supported on a pin 169 (FIG. 4) that is secured to the flange part 61 of the receptacle 41. The operating member 167 has a slot 171 (FIG. 4) therein that receives the spring supporting pin 134 that is attached to the member 125 to provide an operative connection between the operating member 167 and the member 125. A handle portion 175 is secured to the outer end of the operating member 167.

A plate member 177 (FIGS. 1–5) is suitably secured at one end thereof, to the end wall 45 (FIGS. 4 and 5), and at the other end to a supporting post 179 (FIG. 4) that is secured to the flange portion 61 of the back plate by means of a nut and bolt combination 181. The plate 177 has an elongated opening 183 (FIG. 5) therein to receive the generally flat operating member 167, and a resilient gasket member 185 having a slit-portion 187 down the center thereof, is secured to the underside of the plate 177 to receive the arm 167 and substantially close or seal the opening 183 in all positions of the operating member 167. Rod members 191 and 193 (FIG. 4) may be fixedly secured to the plate 177 adjacent the opening 183 to receive the hasps of a plurality of pad locks to enable workers to padlock the operating arm 167 in either the "off" or "on" position. As can be seen in FIG. 1, the cover 11 is provided with an elongated opening 195 therein having an enlarged portion 197 at each of two opposite ends thereof for receiving the operating member 167 and handle 175 so that the door can be moved to the opened and closed position without disturbing the operative connection between the operating member 167 and the enclosed switch structure 51.

The switch operating mechanism 105 is shown in FIGS. 4–6 in the "off" or open circuit position. As can be seen in FIGS. 4 and 5, when the switch structure 51 is in the open position a worker looking into the receptacle 41 from the front of the switchboard can clearly see that the contacts 91 are opened and clear of the stationary contacts so that the worker can be sure that the circuit from the bus bars is open. When the unit door is moved to the closed position thereby defeating interlocking means that will be hereinafter specifically described, the switch can be operated to the closed position. The switch is operated to the closed position by rotation of the operating member 167 (FIG. 4) in a clockwise direction about the pivot 169. During this movement, the pin 134 that is secured to the member 125, and that fits through the slot 171 in the operating member 167, is moved to move the member 125 in a clockwise (FIG. 4) direction about the pivot 123. As can be seen in FIG. 13, the pivot 123 is the end of the operating rod 117, and was previously described, the member 125 is free to rotate on the pin 123. As the member 125 rotates about the pivot 123, the upper projection 161 (FIGS. 4, 6, 10 and 11) engages the adjacent ledge 163 (FIGS. 6 and 12) on the member 119 to move the member 119 in a clockwise (FIG. 4) direction about the pivot 123. As the member 119 (FIGS. 4–6 and 12) is rotated in a clockwise (FIG. 4) direction, the surface adjacent the apex-part 143 thereof engages the roller 147 (FIG. 6) that is attached to the pin 145 that is in turn fixed to the supporting leg 113, and the member 119 is cammed in a direction to charge the over-center spring 133 that is fixed, at one end to the member 119 and at the other end to the pin 134. This movement of the member 119 is permitted because of the elongated opening 121 (FIG. 12) in the member 119 that receives the pin 123. When the member 119 reaches the point where the roller 147 (FIG. 6) reaches the tip of the apex-part 143, the roller 147 will pass over the tip and the charged spring 133 will serve to snap the member 119 in a clockwise (FIG. 4) direction. During this movement, one of the lower ledges 157 (FIG. 12) in the member 119 will engage one of the projections 151 (FIG. 13) to rotate the member 155 and the operating rod structure 115 that is rigidly secured thereto in a clockwise (FIG. 4) direction about the pivot 123, 131 with a snap action. This movement is limited by the engagement of stop means 199 (FIG. 6) with the pin 147 that is attached to the supporting leg 113. As the member 115 is rotated in the clockwise direction this movement will move the switch-structure connecting arms 101 to move the tie bar 93 to in turn simultaneously pivot all three of the knife-blade type movable contacts 91 about their pivots 95 to the closed position in engagement with the clip-type stationary contact structures 85 (FIG. 4). The reverse or counterclockwise movement (FIG. 4) of the operating member 167 will operate in the same general manner hereinbefore described to operate the operating mechanism 105 to simultaneously move the three knife-blade movable contact arms 91 to the open position seen in FIG. 4. Each of the knife-blade contacts 91 moves within a slot in the associated arc-hood 89 to the open and closed position in a manner well known in the art.

Figure 14:
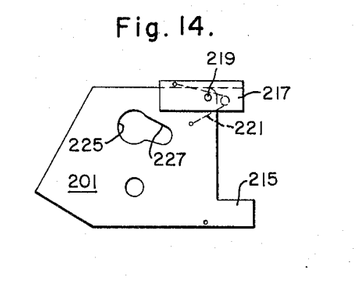
FIG. 14 is a plan view of the latch structure seen in FIGS. 7–9.
Figure 15:
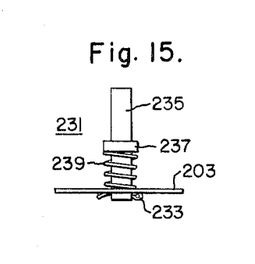
FIG. 15 is a partial elevational view illustrating parts of the latch means seen in FIGS. 7–9.

Referring to FIGS. 4, 5 and 7–9, a latch member 201 is supported on a generally U-shaped bracket 203 that is supported on the underside of the plate 177 by means of two bolts 205 that pass through openings in the opposite legs of the U-shaped bracket 203 and are fixedly secured to the plate 177. The latch member 201 is rotatably supported on a pin 209 that is fixedly secured to the bracket 203, and two bushings 211 (FIG. 4) serve to prevent axial movement of the latch member 201 on the pin 209. As can be seen in FIG. 14, the latch member 201 has a leg portion 215 extending therefrom that is formed rigid with the member 201. Another leg portion 217 is pivotally supported on a pivot pin 219 on the latch member 201 and biased in a counterclockwise (FIG. 14) direction to the normal position seen in FIG. 14 by means of a torsion spring 221. As can be seen in FIG. 4, the member 217 is a generally U-shaped member and it is stopped in the position seen in FIG. 14 when the bight portion thereof engages an edge of the member 201. An opening comprising an enlarged part 225 and a smaller part 227 is provided in the body portion of the latch member 201. A pin 231 (FIG. 15) is supported on the U-shaped bracket 203 to cooperate with the latch member 201. As can be seen in FIG. 15, the lower end of the pin 231 extends through an opening in the bracket 203 and a cotter pin 233 as provided in the lower end to prevent movement of the pin 231 out of the opening in the bracket 203. The member 231 comprises a part 235 of smaller diameter and a part 237 having a larger diameter. A spring member 239 is disposed between the bracket 203 and a shoulder of the part 237 to bias the pin 231 in an upper (FIG. 15) direction. As can be seen in FIGS. 4, 5, and 7–9, the spring member 239 (FIG. 15) biases the pin 235 through the opening 225, 227 (FIG. 14) in the latch member 201 and the outer end of the pin 231 passes through an opening 243 (FIG. 5) in the plate 177 to permit cooperation of the pin 231 and the cover 11 (FIG. 1) in a manner to be hereinafter specifically described. As can be seen in FIGS. 1, 5 and 7–9, a hook or latch member 247 is welded or otherwise rigidly secured to the inside of the cover 11 to cooperate with a latching end 249 on the latch member 201 in a manner to be hereinafter specifically described. As can be seen in FIGS. 7–9, there is a tension spring 253 supported at one end on the bracket 203, and at the other end on the latch member 201 to bias the latch member 201 in a counterclockwise direction about the pivot 209.

Referring to FIGS. 1 and 8, the parts are shown with the switch structure 51 being in the off or open-circuit position and the cover 11 of the switchboard being in the open position. When the parts are so positioned, the cover 11 has moved away from the part 235 of the locking pin 231 and the spring 239 (FIG. 15) has moved the pin 235 to position the enlarged part 237 of the pin in the enlarged part 225 (FIG. 14) of the latch opening. With the parts so positioned, the part 237 of the pin 235 locks the latch 201 against movement. Thus, if an attempt is made to close the switch 51 by means of the operating member 167, the member 167 will engage the latching leg 217 (FIG. 8) on the member 201, which leg 217 cannot move in a counterclockwise direction about the pivot 219 because of the engagement of the bight portion thereof with the edge of the member 201, and, since the latch member 201 is latched by engagement of the part 237 of the pin 231 in the opening 225, movement of the operating member 167 to the "on" or closed-circuit position is prevented. Thus, with the door 11 (FIG. 1) in the open position the latch 201 is automatically latched to prevent operation of the enclosed switch to the closed position.

With the cabinet door 11 (FIG. 1) in the open position and the enclosed switch structure 51 in the open position, a worker can defeat the latch 201 to permit a closing operation of the switch structure. Thus, a worker can press in on the pin part 235 of the locking pin 231 with one hand and operate the operating member 167 with the other hand. When the pin 235 is pressed inward, the part 237 (FIG. 15) thereof moves out of the opening 225 and the part 235 of the pin 231 is aligned with the opening 225 whereupon the latch member 201 is free to move in a counterclockwise direction about the pivot 209. Thereafter, the spring 253 operates to rotate the latch 201 counterclockwise during which movement the part 235 of the pin 231 becomes positioned in the smaller part 227 of the opening in the latch member 201. Thus, as the operating member 167 is moved to close the switch the latch 201 will be rotated out of the latching position and the latching leg 217 thereof will be free of the path of the operating member 167 permitting a closing movement of the member 167 to thereby permit a closing operation of the switch structure 51.

After the switch structure 51 has been operated to the closed position by means of the above-mentioned defeating operation and while the cover 11 of the switchboard is still in the open position, the switch can be freely operated back to the open position during which movement the operating member 167 will engage the leg 215 of the latch 201 rotating the latch 201 in a clockwise direction against the bias of the spring 253 and when the latch 201 reaches the position seen in FIG. 8, the spring 239 (FIG. 15) will operate to bias the locking pin 231 back upward to move the part 237 of the pin 231 into the enlarged part 225 (FIG. 14) of the opening in the latch member 201 to again latch the latch member 201 in the latching position shown in FIG. 8 to thereby again latch the operating member 167 in the open position.

As was previously described, the control unit 39 can be withdrawn to the disconnected position (FIG. 2) when the cover 11 (FIG. 1) is in the open position. Part of the disconnected control unit receptacle 41 and part of the open switchboard cover 11 are both shown in dot-and-dash lines in FIG. 3 to clearly show that with a control unit in the disconnected position the receptacle 41 would engage the cover 11 to prevent movement of the cover 11 to the closed position. Thus, with the control unit 39 in the disconnected position and the cabinet cover 11 in the open position the enclosed switch 51 is latched in the open position and the cover 11 cannot be moved to automatically release the latching mechanism in order to permit closing of the switch structure 51. Under these circumstances, the hereinbefore described defeating operation of the latch mechanism is necessary in order to permit a closing operation of the switch structure 51. Thus, it is less likely that the enclosed switch will be in the closed position when the control unit 39 is moved back to the connected position. It can be understood that the same situation will prevail when the unit 39 is entirely withdrawn from the switchboard with the switch opened in that an automatic release of the latching mechanism will not occur since the cover 11 is retained on the switchboard cabinet. Thus, when the switch is completely withdrawn it will also take a specific defeating operation of the latching mechanism in order to permit a closing operation of the switch.

With the control unit 39 in connected position and the switch structure 51 in the open position, the cover 11 (FIG. 1) can be freely pivoted about the hinges 13 to the closed position during which movement the latching mechanism is automatically released to permit free operation of the switch structure 51. As can be seen in FIG. 1, when the switch is in the open position the handle 175 is positioned to align with the lower enlarged portion 197 of the opening 195 so that the cover 11 can be freely moved to the closed position. As the cover is moved to the closed position, the inside surface of the cover 11 engages the pin 235 (FIG. 4) and moves the pin 235 downward against the bias of the spring 239 (FIG. 15) to move the enlarged part 237 (FIG. 15) of the pin 231 out of the opening 225 (FIG. 14) to thereby release the latch 201 in the same manner hereinbefore described. While the cover 11 is closed, the cover will maintain the latching pin 231 in the releasing position previously described and the enclosed switch structure 51 can be freely operated to the opened and closed positions by operation of the external operating member 167 in the same manner hereinbefore described. As the operating member 167 is moved to the open and closed positions, the resilient gasket 185 (FIG. 5) having the slit 187 therein, which gasket 185 is formed and mounted to maintain the slit 187 in a closed position, will operate automatically to substantially close the opening in the plate 177.

When the switchboard cover 11 is in the closed position and the switch structure 51 is operated to the closed position, the latch 201 is automatically operated to latch the cover 11 in the closed position. Referring to FIG. 7, it will be noted that when the switch operating member 167 is moved to the closed position with the cover closed the spring 253 will operate to rotate the latch 201 in a counterclockwise direction about the pivot 209 and the latch end 249 of the latch 201 will thereby be automatically positioned under the hook 247 that is fixedly secured to the cover 11 (FIG. 1). Thus, if an attempt is made to open the cover with the enclosed switch structure 51 in the closed position the hook 247 will engage the latch 201 to prevent an opening operation of the cover. As will be readily understood with reference to FIGS. 4, 7 and 8, when the switch structure 51 is operated to the open position the switch operating member 167 will engage the leg 215 of the latch 201 to pivot the latch about the pivot 209 against the bias of the spring 253 to the cover releasing position wherein the latch end 249 is clear of the hook 247.

When the cover 11 and switch 51 are both in the closed position the latching mechanism can be defeated in order to permit an opening operation of the cover. A leg 215 (FIG. 7) of the latch 201 is disposed just under the opening 183 (FIG. 5) in the plate 177 and a screwdriver blade or other similar tool can be passed through the opening 183 and through the slit 187 in the gasket 185 to be positioned adjacent the leg 215 (FIG. 7) of the latch member 201. The screwdriver blade is shown in section at 263 in FIG. 7. Thereafter, the blade can be moved downward (FIG. 7) to rotate the latch 201 in a clockwise direction about the pivot 209 against the bias of the spring 253 to thereby move the latching end 249 out from latching engagement with the hook member 247 that is secured to the cover 11 and the cover 11 can be freely pivoted to the opened position. When the latch 201 reaches the position seen in FIG. 9 and the cover 11 is opened, the spring 239 (FIG. 15) will bias the locking pin 231 outward to move the part 237 into the opening part 225 (FIG. 14) of the latch member 201 to latch the latch member 201 in the position seen in FIG. 9. It can be understood that the defeating and opening operation requires that a screwdriver or other tool be operated to the releasing position with one hand and the cover 11 be moved with the other hand, at least to the position clearing the cover hook 247 from the latch point 249, while the latch member 201 is held in the releasing position against the bias of the spring 253.

After the cover has been opened by means of a defeating operation with the enclosed switch in the closed position, the switch can still be operated to the open position whereupon the switch will be automatically latched in the open position. During this movement, the operating member 167 will engage the pivotally supported latching leg 217 (FIG. 9) to rotate the latching leg 217 about the pivot 119 and against the bias of the torsion spring 221 to thereby permit the operating member 167 to be moved into the closed and latched position seen in FIG. 8. In FIG. 9, the operating member 167 is shown during the opening operation in the process of pivoting the latching leg 217 out of the way. As the operating member 167 passes the latching leg 217, the torsion spring 221 will serve to return the leg 217 to the position seen in FIG. 8 and the operating member 167 will again be latched in the open position so that a defeating operation will be required in order to effect a closing operation of the switch structure 51. The defeating operation can be effected either by a manual depression of the part 235 of the pin 231 or by means of a cover closing operation in the same manner hereinbefore described.

As can be seen in FIGS. 4 and 5, the switch structure 51 is connected to the operating mechanism 105 by means of the positioning of the switch operating rod 117 of the rod structure 115 in the bifurcated portion of the support arms 101. In order to change the switch structure in the control unit, the screws 88 that secure the insulating block 87 (FIG. 4) in place are removed and the switch structure 51 is removed from the unit. As can be seen in FIG. 5, each of the insulating arc-hoods 89 is removably held in the mounted position by means of a resilient generally U-shaped spring clip 267. The bight portion of each of the clips 267 is supported between the associated conductor 79 and the insulating support block 87. In order to remove the switch structure 51, the three arc-hoods 89 are merely pulled out of their spring mounted positions. Thereafter, the switch terminals 83 are loosened and the conductors 81 are disconnected. The switch is then operated to the closed position and the switch structure 51 is moved downward during which movement bifurcated connecting arms 101 thereof are moved away from the rod 117 and the switch structure 51 is removed from the receptacle. The removal operation is safely effected with the control unit 39 in the disconnected or withdrawn position. Another similar switch structure 51 having a different rating can readily be replaced by merely moving the switch structure into the mounted position with the connecting arms 101 thereof being moved to a position receiving the operating rod 117 of the switch operating mechanism 105. The new switch structure is secured in place by means of the four screws 88. An advantage of operating a switch structure 51 of the type disclosed in FIGS. 1 and 5, is that the contacts 91 are clearly visible to a worker when they are in the open position so that a worker, with confidence, can padlock the operating handle 167 in the open position with a clear visual indication that the contacts 91 are opened. Thus, a worker can have increased confidence in working in the environment of the switchboard. Moreover, different switch structures similar to the structure 51 and having different ratings can be freely substituted in the control unit to operate in the same manner and, if for any reason the switch structure 51 becomes damaged, the switch structure is readily replaceable to be operated by the common operating mechanism 105 that is secured to the receptacle 41 of the associated control unit.

From the foregoing, it will be understood that there is provided by this invention an improved switchboard or control center structure. The control center structure comprises a cabinet and a withdrawable control unit mounted in the cabinet and operatively connected to a plurality of bus bars that are supported in the cabinet. When the control unit door, which is hinged on the switchboard, is in the open position, the control unit can be moved to a position disconnected from the bus bars. The control unit can also be readily removed and replaced by another control unit in the control center. The control unit comprises a circuit interrupter or switch structure that is mounted on the control unit receptacle and an operating mechanism that is separately mounted on the control unit receptacle. The operating mechanism comprises an operating handle member that is mounted on the control unit receptacle and that extends out through an opening in the cabinet door or cover when the cover is moved to the closed position so that the handle is operatively connected to operate the interrupter structure regardless of the position of the openable cover. The operating member is movable along a plane that is generally normal to the plane of the closed cover and an enlarged handle portion at the end thereof aligns with a different enlarged part of of the cover opening at each of the two operating positions of the operating member. The operating member moves in a slit in a generally resilient sealing member that substantially closes the cover opening regardless of the position of the operating member. Latching means is also mounted on the control unit receptacle. When the control unit is in the connected position and the cabinet cover is in the closed position, the enclosed interrupter can be freely operated to the open and closed position by operation of the external operating handle. When the switch is operated to the closed position, the latching means operates automatically to defeatably latch the cabinet cover in the closed position. When the interrupter is opened the latching means is automatically released to permit opening of the cover. When the cover is moved to the open position the latching means is automatically operated to latch the operating member to prevent a closing operation of the interrupter. Means is provided for defeating the latching means to permit a closing operation of the interrupter when the cover is in the open position. If the defeating means is operated when the cover is in the open position and the interrupter is operated to the closed position the switch can thereafter be freely operated to the open position whereupon the latching means automatically operates to again latch the operating member to again prevent an interrupter closing operation. When the cabinet cover is moved to the open position and the switch is automatically latched in the open position if the control unit is moved to the disconnected position the position of the control unit receptacle will interfere with the cover to prevent a closing operation of the cover to thereby prevent an operation that will automatically release the latching means. Thus, it is less likely that the control unit will be moved into the connected position with the interrupter in the closed position. The switch blades or movable contact arms of the interrupter structure are clearly visible in the open position and means is provided to enable padlocking of the operating member to prevent a closing operation of the interrupter. Thus, a worker can have confidence in the assurance that a particular circuit is visibly open and locked open. If it is desired to change the rating of the interrupter structure or if the interrupter structure becomes damaged, the interrupter structure can be readily replaced to be operated by the same switch operating mechanism and latching mechanism both of which mechanisms are mounted on the control unit receptacle.

Since numerous changes may be made in the above-described construction and different embodiments of the invention may be made without departing from the spirit and scope of the invention, it is intended that all matter contained in the foregoing description or shown in the accompanying drawings shall be interpreted as illustrative and not in a limiting sense.

I claim as my invention:

1. A control center structure comprising a cabinet having a cabinet opening therein, a plurality of bus bars supported in said cabinet, a control unit comprising a control unit support supported in said cabinet in proximity to said cabinet opening, a cover supported on said cabinet and movable to open and close said cabinet opening, a circuit interrupter structure supported on said support, said circuit interrupter structure comprising a plurality of pairs of cooperable contacts, an operating member supported on said support, means connecting said operating member with said circuit interrupter structure regardless of the position of said cover, said operating member being manually movable to open and close said pairs of contacts, said cover having an opening therein, when said cover is moved to the closed position said operating member protruding through said cover opening to permit external operation of said contacts, bus bar connecting means supported on said support and electrically connected to said circuit interrupter structure contacts, said control unit being in a connected position with said bus bar connecting means being connected to said bus bars, latch means supported on said support, said latch means operating automatically when said cover is moved to the open position and said contacts are in the open position to prevent a closing operation of said contacts, means operating automatically when said cover is moved to the closed position to defeat said latch means to permit a closing operation of said contacts, said control unit being supported in said cabinet such that when said cover is in the open position said control unit is movable from said connected position to a disconnected position wherein said bus bar connecting means is disconnected from said bus bars, means for supporting said control unit on said cabinet in said disconnected position, and means operable when said control unit is in said disconnected position to prevent a closing operation of said cabinet cover to thereby prevent an automatic defeat of said latch means by a closing operation of said cover.

2. A control center structure comprising a cabinet having a cabinet opening at the front thereof, a plurality of bus bars supported in said cabinet, a control unit comprising a receptacle supported in said cabinet, said receptacle having a receptacle opening aligned with said cabinet opening, a cover supported on said cabinet and movable to open and close said cabinet opening and said receptacle opening, a circuit interrupter structure supported in said receptacle, said circuit interrupter structure comprising a plurality of pairs of cooperable contacts, an operating member supported on said receptacle and operatively connected to said circuit interrupter structure regardless of the position of said cover, said operating member being manually movable to open and close said pairs of contacts, said cover having an opening therein, when said cover is moved to the closed position said operating member protruding through said cover opening to permit external operation of said contacts, bus bar connecting means supported on said receptacle and electrically connected to said circuit interrupter structure contacts, said control unit being in a connected position with said bus bar connecting means being connected to said bus bars, latch means supported on said receptacle, said latch means operating automatically when said cover is moved to the open position and said circuit interrupter contacts are in the open position to prevent a closing operation of said contacts, means operating automatically when said cover is moved to the closed position to defeat said latch means to permit a closing operation of said contacts, when said cover is in the open position said control unit being movable from said connected position to a disconnected position wherein said bus bar connecting means is disconnected from said bus bars, means for supporting said control unit on said cabinet in said disconnected position, when said control unit is in said disconnected position said receptacle protruding through said cabinet opening to prevent a closing operation of said cabinet cover to thereby prevent an automatic defeat of said latching means by a closing operation of said cover.

3. A control center structure comprising a cabinet having a cabinet opening at the front thereof, a plurality of bus bars supported in said cabinet, a control unit comprising a control unit support supported in said cabinet in proximity to said cabinet opening, a cover supported on said cabinet and movable to open and close said cabinet opening, a circuit interrupter structure supported on said support, said circuit interrupter structure comprising a plurality of pairs of cooperable contacts, a separate operating mechanism supported on said support, means operatively connecting said operating mechanism to said circuit interrupter structure regardless of the position of said cover, said operating mechanism comprising an operating member movable to operate said operating mechanism to open and close said pairs of contacts, said cover having an opening therein, when said cover is moved to the closed position said operating member protruding through said cover opening to permit external operation of said contacts, bus bar connecting means supported on said support and electrically connected to said circuit interrupter structure contacts, said control unit being in a connected position with said bus bar connecting means being connected to said bus bars, latch means supported on said support, said latch means operating automatically when said cover is moved to the open position and said circuit interrupter contacts are in the open position to prevent a closing operation of said contacts, means operating automatically when said cover is moved to the closed position to defeat said latch means to permit a closing operation of said contacts, said control unit being supported in said cabinet such that when said cover is in the open position said control unit is movable from said connected position to a disconnected position wherein said bus bar connecting means is disconnected from said bus bars, means for supporting said control unit on said cabinet in said disconnected position, when said control unit is in said disconnected position means preventing a closing operation of said cover to thereby prevent an automatic defeat of said latching means.

4. A control center structure comprising a cabinet having a cabinet opening at the front thereof, a plurality of bus bars supported in said cabinet, a control unit comprising a control unit support, support means supporting said control unit in said cabinet in proximity to said cabinet opening, a cover supported on said cabinet and movable to open and close said cabinet opening, a circuit interrupter structure supported on said control unit support, said circuit interrupter structure comprising cooperable contacts, an operating member supported on said control unit support means operatively connecting said operating member to said circuit interrupter structure regardless of the position of said cover, said cover having an opening therein, when said cover is moved to the closed position said operating member protruding through said cover opening to permit external operation of said contacts, said operating member being movable along a plane generally normal to the plane of said closed cover to open and close said contacts, bus bar connecting means supported on said control unit support and electrically connected to said circuit interrupter structure contacts, said control unit being in a connected position with said bus bar connecting means being connected to said bus bars, latch means supported on said control unit support, said latch means operating automatically when said cover is moved to the open position and said circuit interrupter contacts are in the open position to prevent a closing operation of said contacts, means operating automatically when said cover is moved to the closed position to defeat said latch means to permit a closing operation of said contacts, said support means supporting said control unit in said cabinet such that when said cover is in the open position said control unit is movable from said connected position to a disconnected position wherein said bus bar connecting means is disconnected from said bus bars, said support means being constructed to support said control unit on said cabinet in said disconnected position, when said control unit is in said disconnected position means preventing a closing operation of said cabinet cover.

5. A control center structure comprising a supporting cabinet having an opening therein, a plurality of bus bars supported in said supporting cabinet, a control unit comprising a receptacle supported in said cabinet and having a receptacle opening aligned with said cabinet opening, a circuit interrupter structure supported in said receptacle and comprising cooperable contacts, connecting means electrically connecting said circuit interrupter structure with said bus bars when said control unit is in the connected position, an operating member supported on said receptacle, a cover having an opening therein and being movably supported on said cabinet, said cover being movable to a closed position to close said cabinet opening and said receptacle opening during which movement said opening in said cover receives said operating member to permit external operation of said operating member, means operatively connecting said operating member with said circuit interrupter structure regardless of the position of said cover, said operating member being operable to open and close said contacts, latch means supported on said receptacle, a cover latch supported on said cover, a first spring means, when said cover is in the closed position and said operating member is operated to operate said contacts to the closed position, said first spring means operating said latch means to a position wherein said latch means will engage said cover latch to prevent opening of said cover, when said operating member is operated to open said contacts, said operating member engaging said latch means and operating said latch means against the bias of said first spring means to a position clear of said cover latch to permit opening of said cover, when said contacts are in the open position and said cover is moved to the open position a second spring means operating said latch means to latch said latch means in a position wherein said latch means will engage said operating member to prevent a closing operation of said contacts, when said cover is moved to the closed position said cover engaging said latch means to operate said latch means against the bias of said second spring means to an unlatching position free of said operating member to permit free operation of said contacts by operation of said operating member, said control unit being movable when said cover is in the open position to a disconnected position wherein said circuit interrupter structure is disconnected from said bus bars, means for supporting said control unit on said cabinet in said disconnected position, said control unit in said disconnected position protruding through said cabinet opening to prevent a closing operation of said cover whereby when said cover is in the open position and said control unit is in the disconnected position said circuit interrupter structure is automatically latched in the open position and said cover cannot be moved to the closed position to automatically operate said latch means to said unlatching position.

6. A control center structure comprising a supporting cabinet having an opening at the front thereof, a plurality of bus bars supported in said cabinet, a control unit comprising a receptacle supported in said cabinet, said receptacle having a receptacle opening aligned with said cabinet opening, a cover supported on said cabinet and movable to open and close said cabinet opening and said receptacle opening, a switch structure supported in said receptacle and comprising a plurality of stationary contacts and a plurality of movable contacts simultaneously movable into and out of engagement with said stationary contacts, said control unit being in a connected position with means connecting said contacts with said bus bars, a switch operating mechanism supported on said cabinet and comprising an overcenter spring means and an operating rod operable by operation of said overcenter spring means to simultaneously move said movable contacts into and out of engagement with said stationary contacts, said switch operating mechanism comprising an operating member supported on said receptacle and extending out through the front of said cabinet, said cabinet cover having an opening therein for receiving said operating member whereby said operating member is manually operable to operate said overcenter spring means and operating rod from outside of said cabinet when said cabinet cover is in the closed position, said switch operating mechanism being continuously connected to said movable contacts regardless of the position of said cover, latch means supported on said receptacle, a cover latch supported on said cover, when said cover is closed and said operating member is operated to operate said contacts to the closed position said latch means being automatically moved to engage said cover latch to prevent an opening operation of said cover, when said operating member is operated to operate said contacts to the open position said latch means being automatically moved out of engagement with said cover latch to permit an opening operation of said cover, when said operating member is in the position wherein said contacts are open and said cover is moved to the open position said latch means being automatically operated to a latching condition to prevent a closing operation of said contacts, when said operating member is in the position wherein said contacts are open and said cover is moved to the closed position said cover operating said latch means to an unlatching condition to permit free operation of said contacts, said control unit being supported in said cabinet such that when said cover is in the open position said control unit is movable from said connected position to a disconnected position to electrically disconnect said contacts from said bus bars, means for supporting said control unit on said cabinet in said disconnected position, and means operating to prevent a closing operation of said cover when said control unit is in said disconnected position.

7. A control center structure comprising a supporting cabinet having an opening at the front thereof, a plurality of bus bars supported in said cabinet, a control unit comprising a receptacle, support means supporting said control unit in said cabinet, said receptacle having a receptacle opening aligned with said cabinet opening, a cover supported on said cabinet and movable to open and close said cabinet opening and said receptacle opening, a switch structure supported in said receptacle and comprising a plurality of stationary contacts and a plurality of movable contacts simultaneously movable into and out of engagement with said stationary contacts, said control unit being in a connected position with means connecting said contacts with said bus bars, a switch operating mechanism supported on said receptacle and comprising an overcenter spring means and an operating rod operable by operation of said overcenter spring means to simultaneously move said movable contacts into and out of engagement with said stationary contacts, connecting means removably connecting said switch operating mechanism with said switch structure, said connecting means connecting said switch operating mechanism with said switch structure regardless of the position of said cover, said switch operating mechanism comprising an operating member supported on said receptacle and extending out through the front of said cabinet, said cabinet cover having an opening therein for receiving said operating member whereby said operating member is manually operable to operate said operating mechanism to thereby operate said contacts from outside of said cabinet when said cabinet cover is in the closed position, said operating member being operatively movable along a plane that is generally normal to the plane of said closed cover, latch means supported on said receptacle, a cover latch supported on said cover, when said cover is closed and said operating member is operated to operate said contacts to the closed position said latch means being automatically moved to engage said cover latch to prevent an opening operation of said cover, when said operating member is operated to operate said contacts to the open position said latch means being automatically moved out of engagement with said cover latch to permit an opening operation of said cover, when said operating member is in the position wherein said contacts are open and said cover is moved to the open position said latch means being automatically operated to a latching condition to prevent a closing operation of said contacts, when said operating member is in the position wherein said contacts are open and said cover is moved to the closed position said cover operating said latch means to an unlatching condition to permit free operation of said contacts, said support means being constructed such that when said cover is in the open position said control unit is movable from said connected positon to a disconnected position to electrically disconnect said contacts from said bus bars, said support means being constructed to enable support of said control unit on said cabinet in said disconnected position, and means operating automatically when said control unit is moved to said disconnected and supported position to prevent a closing operation of said cover.

References Cited by the Examiner
UNITED STATES PATENTS

| | | | |
|---|---|---|---|
| 1,893,829 | 1/1933 | Hammerly | 200—50 |
| 2,719,251 | 9/1955 | Stewart | 317—120 |
| 3,122,681 | 2/1964 | Pusch | 200—50 X |

ROBERT K. SCHAEFER, *Primary Examiner.*

KATHLEEN H. CLAFFY, *Examiner.*

M. GINSBURG, *Assistant Examiner.*